United States Patent [19]

Ulijasz

[11] Patent Number: 4,815,814
[45] Date of Patent: Mar. 28, 1989

[54] UNDER-CARPET FLAT CABLE ASSEMBLY AND METHOD OF FORMING A TURN IN SAME

[75] Inventor: Thaddeus R. Ulijasz, Geneva, Ill.

[73] Assignee: Cooper Industries, Inc., Houston, Tex.

[21] Appl. No.: 903,202

[22] Filed: Sep. 2, 1986

[51] Int. Cl.[4] .............................................. G02B 6/44
[52] U.S. Cl. ................................. 350/96.23; 30/91.2; 174/71 R; 264/272.11
[58] Field of Search ................... 174/10, 70 R, 70 C, 174/71 R, 72 R, 72 C, 115, 117 R, 117 F, 117 FF; 350/96.23; 29/868; 264/272.11

[56] References Cited

U.S. PATENT DOCUMENTS

| 3,748,371 | 7/1973 | Krook et al. | 174/10 X |
| 4,038,489 | 7/1977 | Stenson et al. | 350/96.23 X |
| 4,404,425 | 9/1983 | Rich | 174/70 C X |
| 4,496,215 | 1/1985 | Shaheen et al. | 350/96.23 |
| 4,665,280 | 5/1987 | Bowen | 174/71 R |

FOREIGN PATENT DOCUMENTS

| 202623 | 3/1959 | Austria | 174/70 C |
| 2513723 | 10/1976 | Fed. Rep. of Germany | 350/96.23 |
| 3232108 | 3/1984 | Fed. Rep. of Germany | 350/96.23 |
| 60-185915 | 9/1985 | Japan | 350/96.23 |
| 60-263908 | 12/1985 | Japan | 350/96.23 |
| 21021 | of 1909 | United Kingdom | 174/71 R |

*Primary Examiner*—Laramie E. Askin
*Attorney, Agent, or Firm*—Fitch, Even, Tabin & Flannery

[57] ABSTRACT

A thin, relatively flat fiber optic cable assembly for laying under carpet. The cable assembly includes at least one resilient buffer tube and at least one optical conductor disposed inside the tube and being movable therein. The cable assembly includes a strength member having limited elasticity and a plastic jacket formed about the tube and the strength member with the jacket having a flat top surface and a flat bottom surface disposed parallel to the top surface. The tube and the strength member are positioned in the jacket midway between the top and bottom surfaces with the tube and the strength member being spaced and with their respective axes positioned in a plane which is generally parallel to the top and bottom surfaces so that a bend can be formed in the cable by removing a section of the jacket to expose the strength member and the buffer tube. A method of forming and defining the turn using the fiber optic cable assembly is also disclosed.

2 Claims, 2 Drawing Sheets

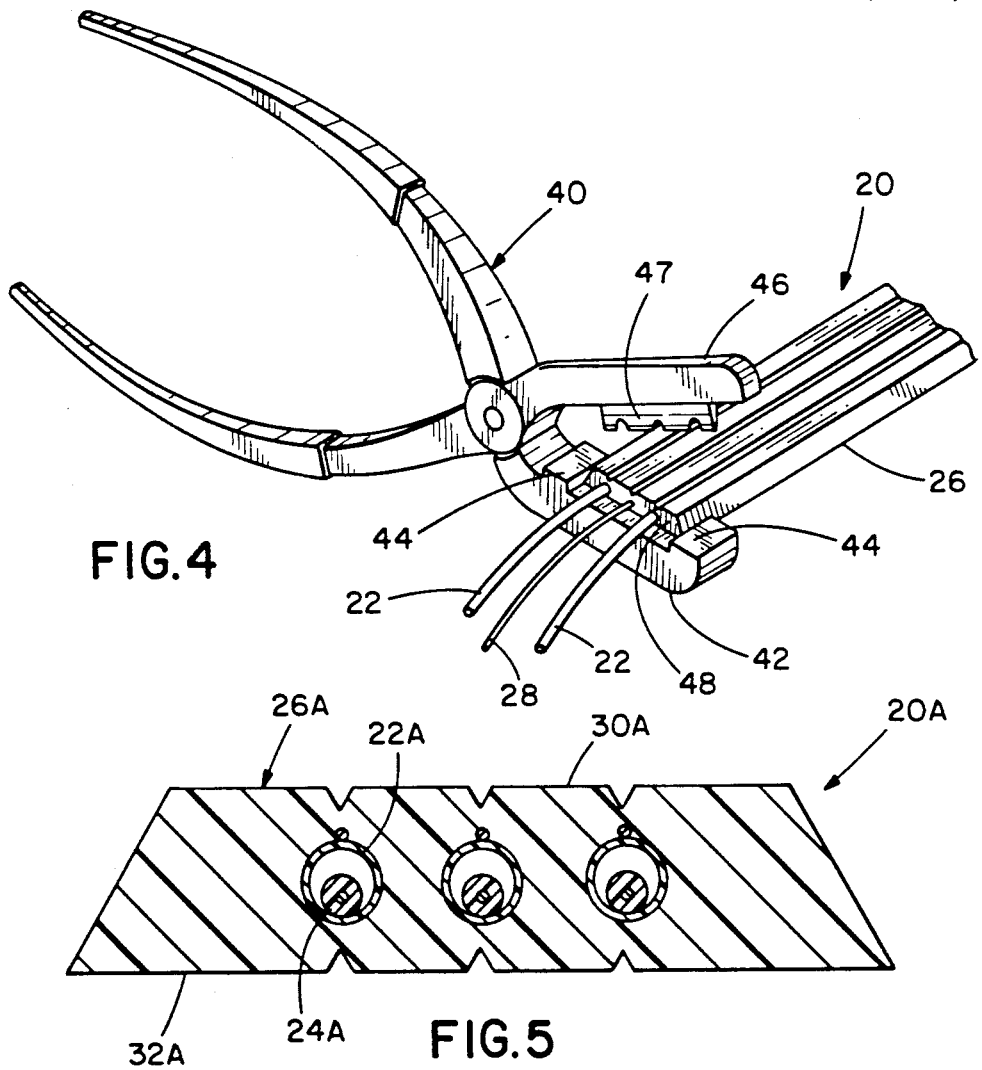
FIG.4
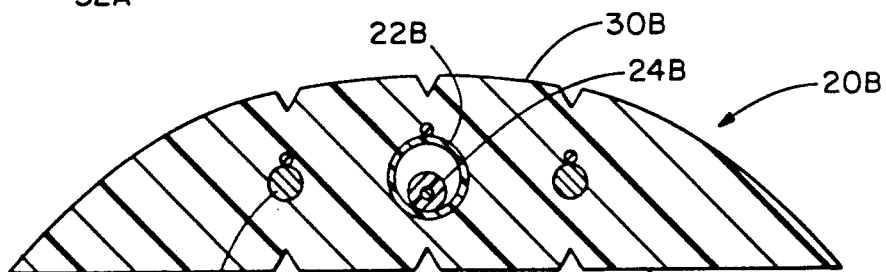
FIG.5
FIG.6
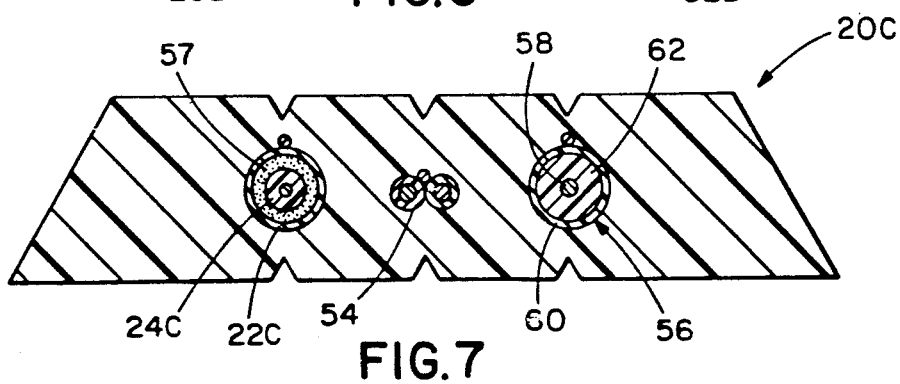
FIG.7

UNDER-CARPET FLAT CABLE ASSEMBLY AND METHOD OF FORMING A TURN IN SAME

The present invention relates to cable assemblies and, more specifically, to a thin, substantially flat cable assembly including a conductor, such as an optical fiber, which can undergo only limited bending without damage.

BACKGROUND OF THE INVENTION

One particularly efficient and economical way to route electrical conductors is through the use of a ribbon cable, having a number of spaced parallel electrical conductors held in a thin, flexible layer of insulation, laid under carpeting in, for example, office areas. A change in direction in such a flat cable is achieved by sharply folding the cable upon itself so that stacked layers of the cable result at the bend. While such a method of changing direction can be employed with a ribbon cable having spaced copper wires which can undergo an immediate 90 or 180 degree bend, this method of changing direction is not suitable with a cable assembly including an optical fiber or a coaxial cable. Sharp bending of an optical fiber will result in light attenuation, while folding an optical fiber on itself will cause it to break. Folding of a coaxial cable will mechanically damage the shield, displace the dielectric between the conductor and shield, and cause a change in the impedance characteristics of the cable. Also, folding of a cable upon itself doubles its thickness, which could make the presence of the cable under carpeting more noticeable. Of course, bending of a flat cable in the plane of the cable results in no appreciable increase in cable thickness.

One recently-proposed generally flat coaxial cable assembly for use under carpeting includes a jacket of polyvinyl chloride (PVC) having a central portion, holding a small coaxial cable, and side portions each having a stress-bearing member of nylon. The stress-bearing members, which are relatively inelastic, are independently longitudinally movable in the jacket. Bending of the flat cable assembly in the plane of the flat cable causes the member at the inside of the bend to extend beyond the jacket while the member at the outside of the bend is drawn inside the jacket. As the stress-bearing members must move throughout the length of the cable assembly, the force required to form the bend is a function of the length of the cable assembly. For further information regarding the structure and operation of such a cable assembly, reference may be made to U.S. Pat. No. 4,419,538.

Another recently proposed generally flat fiber optic cable assembly is manufactured with a right angle turn section. The fiber optic filaments of the cable are held in tension and separated by combs. The filaments are embedded in a resin layer disposed between laminations. Bonding of the components is effected in a press under heat and pressure to form the required curved section in a flat fiber optic cable. For further information regarding the structure and manufacture of this cable assembly, reference may be made to U.S. Pat. No. 4,496,215.

SUMMARY OF THE INVENTION

Among the several aspects and features of the present invention may be noted the provision of an improved under-carpet cable assembly. The cable assembly is thin and relatively flat and a turn can be formed in the plane of the cable in the field by a relatively unskilled installer using only simple hand tools. The conductors of the cable assembly can readily be separated from the jacket material. The cable assembly includes optical conductors which are loosely held in the cable assembly so that the optical fibers are free to move in response to temperature changes. Furthermore, the cable assembly is reliable in use, has long service life, is lightweight and is relatively easy and economical to manufacture. Other features and aspects of the present invention will be in part apparent and in part pointed out hereinafter in the following specification and drawings.

Briefly, a cable assembly embodying various aspects of the present invention includes at least one resilient buffer tube and at least one optical conductor inside the tube and movable therein. The assembly may include at least one strength member having limited elasticity and a plastic jacket formed about the tube and the strength member. The jacket has substantially flat, parallel top and bottom surfaces with the tube and strength member being disposed in the jacket substantially midway between these surfaces. The tube and strength member are spaced and their respective axes are positioned in a plane which is generally parallel to these surfaces.

A method of forming a turn in this cable assembly includes the following steps:
 (a) Transverse cuts are formed through the jacket without cutting the tube or the strength member;
 (b) Longitudinal splits are formed in the jacket intermediate these cuts at the tube and the strength member;
 (c) The jacket material between the cuts is removed to expose the tube and the strength member;
 (d) Cable portions between which the jacket has been removed are positioned to define the desired turn in the plane of the bottom surface; and
 (e) The cable portions, the exposed tube and the strength member are maintained in their positions defining the turn.

BRIEF DESCRIPTION OF THE DRAWINGS

FIG. 4 is a perspective view of a pliers-type cutting tool for transversely cutting the jacket material of the cable assembly;

FIG. 5, similar to FIG. 2, shows a first preferred alternative embodiment of the cable assembly including a trio of spaced buffer tubes each holding optical conductors;

FIG. 6, also similar to FIG. 2, shows a second preferred alternative embodiment of the cable assembly of the present invention including a pair of spaced strength members flanking a buffer tube; and FIG. 7, also similar to FIG. 2, illustrates a third preferred alternative embodiment of the cable assembly of the present invention including a coaxial cable and a twisted pair of insulated electrical conductors.

DESCRIPTION OF THE PREFERRED EMBODIMENTS

Figure 1:
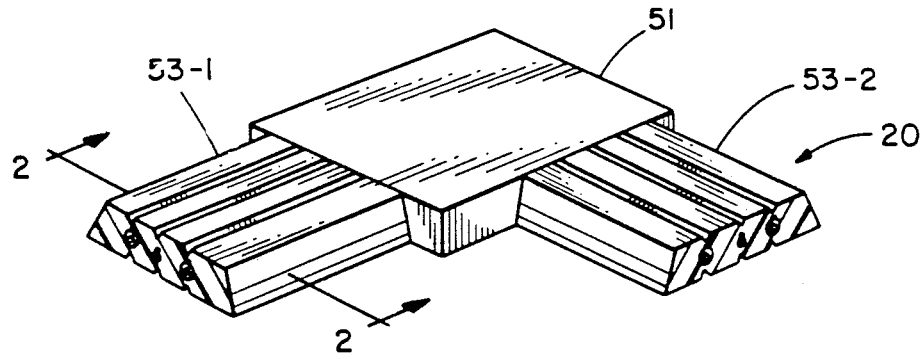
FIG. 1 is a perspective view of a thin, relatively flat fiber optic cable assembly embodying various features of the present invention, in which a right angle turn has been formed.
Figure 2:
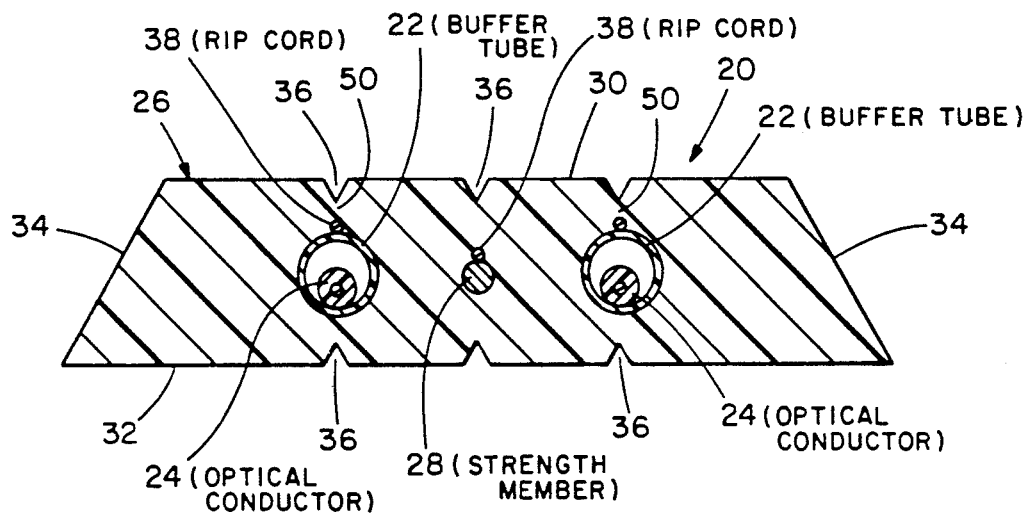
FIG. 2 is a cross-sectional view taken along line 2—2 of FIG. 1 of the cable of FIG. 1 including a pair of buffer tubes, holding optical conductors, flanking a central strength member.

Referring now to the drawings, one preferred embodiment of a thin, relatively flat cable assembly embodying various aspects of the present invention is generally indicated in FIG. 1 by reference numeral 20. The flat cable assembly 20 is particularly adapted for, but not restricted to, laying under carpet, and a turn can conveniently be formed in the cable in the plane of the cable. As shown in FIGS. 1-6, the flat cable includes conductors of electromagnetic radiation, such as light, an example of which is an optical conductor including a glass or plastic fiber. The cable could also include small coaxial cables or twisted pairs of electrical conductors, as shown in FIG. 7. In the event of either the optical fiber assembly or the coaxial cable, sharp bends, such as caused by folding the cable on itself, would cause damage.

More specifically, the flat cable assembly 20 shown in FIGS. 1-4 includes a pair of spaced buffer tubes 22 of a somewhat rigid but resilient thermoplastic material such as polycarbonate or the like. Disposed inside each buffer tube 22 are one or more optical conductors 24 which have outside diameters smaller than the inside diameter of the buffer tube. In the event multiple optical conductors 24 are disposed inside each buffer tube, the tube has a sufficient size that the conductors 24 are loosely held so that they are free to move.

Each optical conductor (fiber) 24 may be of the type comprising a commercially available glass or plastic fiber assembly and a protective resilient sleeve formed of, preferably, a plastic material. The fiber assembly has a glass or plastic fiber core for transmitting light, a glass or plastic cladding for reflecting light back into the fiber core, and a plastic coating, applied at the time of manufacture of the core and cladding, for mechanical protection of the fiber.

The freedom of movement of the optical conductors in the plastic tubes avoids damage to the optical conductors. As the thermal coefficient expansion of plastic is much higher than that of glass, a large drop in temperature would cause shrinkage of the plastic. If the glass fiber were embedded in the plastic, it would undergo possibly very severe bending with attendant light attenuation and possible breakage. In the present invention, the optical conductors are movable in the plastic buffer tubes so they can take a different position to relieve stress.

The cable assembly 20 also includes a jacket 26 of a tough, abrasion resistant plastic material. The jacket is preferably extruded about the tubes 22 and a strength member 28 is positioned between the tubes. The strength member 28 has limited elasticity to permit formation of a bend. Additionally, the strength member 28 serves to take the pulling forces to resist elongation of the flat cable assembly when the cable assembly is pulled from a reel during installation of the assembly. Preferred materials for the strength members are Kevlar fibers (Kevlar is a registered trademark of DuPont), copper, steel or fiberglass epoxy rod. Preferred extrudable materials for the jacket 26 which offer flexibility with a degree of strength are PVC and various fluorocarbon plastics which have low flame propagation characteristics.

The jacket 26 preferably has a substantially flat top surface 30 and a substantially flat bottom surface 32 disposed parallel to the top surface. The top surface of the cable could also be arcuate, as shown in FIG. 6. The tubes 22 and the strength member 28 are disposed in the jacket substantially midway between the surfaces. The tubes and strength member are spaced and their respective axes are in a plane which is generally parallel to the top and bottom surfaces. The jacket has lateral surfaces 34 which converge in the direction of the top surface 30. These sloping lateral surfaces function as ramps to the elevated central region of the jacket so that, for example, wheeled carts can easily be moved over the cable assembly as they do not encounter an abrupt step. The gradual elevation provided by the lateral surfaces 34 also makes the cable assembly less obtrusive to personnel.

The top surface 30 and bottom surface 32 of the jacket 26 are preferably provided with longitudinally extending grooves 36 with a groove in alignment with each of the buffer tubes 22 and the strength member 28. The jacket may also include a longitudinally extending rip cord 38 in engagement with each of the buffer tubes and the strength members, with each rip cord being aligned with a corresponding groove on, for example, the top surface 30. As will be discussed more fully hereinafter, these rip cords are for use in removing a portion of the jacket material to expose the buffer tubes 22 and the strength member 28 to permit formation of a bend in the plane of the bottom surface 32 so that the cable can be turned without any sharp bends in the optical conductors 24 which could result in their damage.

Referring to FIG. 4, a pliers-type tool 40 is shown for making transverse cuts through the jacket material 26 but without cutting the buffer tubes 22 or the strength member 28. The tool 40 includes an anvil jaw 42 having spaced abutments 44 for seating and holding the cable assembly 20 against lateral movement. The pliers-type tool 40 also includes a cutting jaw 46 carrying a dependent cutting blade 47 having recesses matching the buffered tubes 22 and strength member 28 in size and location so that when the jaws are closed to effect cutting of the jacket material, the buffer tubes 22 and strength member 28 are not severed. It will be appreciated that by using the tool 40 to provide spaced transverse cuts 48 in the cable assembly 20, the rip cords 38 can be pulled away from their corresponding buffer tubes or strength member to split the jacket material intermediate the cuts 48. That is, the jacket material between a corresponding groove 36 and rip cord 38 forms a relatively thin, rupturable membrane 50. By using the rip cords or force, these membranes can be ruptured and the jacket material between the cuts 48 can be conveniently removed by manipulating the relatively flexible jacket material to expose the buffer tubes and strength members. The grooves 36 on the bottom surface 2 provide weakened areas to promote flexibility on the jacket material so that after longitudinal splitting, the jacket material can be easily deflected away from the tubes and strength member.

Figure 3:
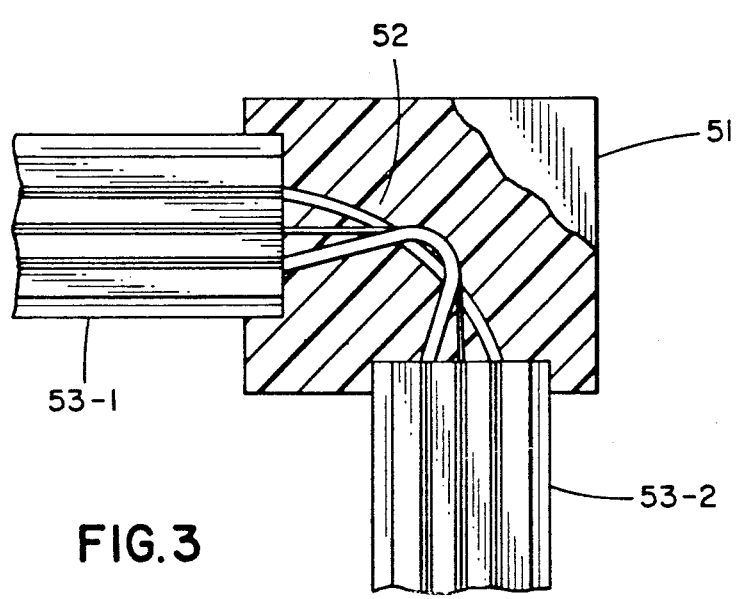
FIG. 3 is a plan view of a portion of the cable of FIG. 1 including the turn showing a potting, a portion of which has been removed, in which the buffer tubes and strength member are embedded.

Referring to FIG. 3, a bend 52 is formed in the cable assembly 20 by positioning the cable portions 53-1, 53-2 adjacent the exposed buffer tubes and strength member so that the bend 52 of desired shape is formed, without exceeding the bending limits of the optical conductor 24. With the bend formed, and the cable portions adjacent the exposed buffer tubes and strength member placed in a form or mold, a potting compound such as epoxy resin or silicone rubber can be poured into the mold. After the potting compound is hardened, the mold can be removed and the bend 52 is permanently formed in the cable assembly by the potting 51 with the bend extending in the plane of the flat cable assembly 20. A junction box could also be used to hold the cable portions 53-1, 53-2 defining the bend.

An alternative preferred embodiment of the flat cable assembly of the present invention is shown in FIG. 5 by reference character 20A. Components of flat cable assembly 20A corresponding to flat cable assembly 20 are indicated by the reference character assigned to assembly 20 with the addition of suffix "A". The cable assembly 20A includes a trio of spaced buffer tubes 22A in which are disposed the optical conductors 24A. No strength members are included.

A second preferred embodiment of the flat cable assembly of the present invention is shown in FIG. 6 by reference character 20B. The flat cable assembly 20B is similar to flat cable assembly 20 except a pair of strength members 28B flank a single buffer tube 22B holding the optical conductors 24B, and the top surface 30B of the cable assembly is arcuate.

A third preferred embodiment of the flat cable assembly of the present invention is shown in FIG. 7 by reference character 20C. This flat cable assembly includes a twisted pair of insulated electrical conductors 54, a small coaxial cable 56 and a buffer tube 22C including an optical conductor 24C. Wound around conductor 24C is a strength member 57 such as formed of fiber glass or Aramid yarn. The small coaxial cable has a central conductor or core 58, a coaxial shield 60 and a tubular layer of dielectric material 62 disposed between the core 58 and the shield 60. The shield 60 could be a cylindrical metallic wall which is capable of undergoing only limited bending without suffering structural damage.

As a method of forming a turn in a thin, relatively flat fiber optic cable assembly 20, the present invention includes several steps:

(a) Spaced transverse cuts 48 are formed through the jacket 26 without cutting the tubes 22 or the strength member 28;

(b) Longitudinal splits are formed in the jacket intermediate the cuts at the tubes and the strength member;

(c) The jacket material is removed between the cuts 48 to expose the tubes 22 and the strength member 28;

(d) The cable portions 53-1, 53-2 between which the jacket has been removed are positioned to define the desired turn 52 in the plane of the bottom surface 32 of the flat cable assembly; and (e) The cable portions 53-1, 53-2 and the exposed tubes and strength members are maintained in their positions defining the turn.

The step of maintaining is preferably achieved by potting the exposed tubes, the exposed strength member and the adjacent ends of the cable portions.

The various optical conductors 24 may be broken out at the ends of the cable assembly 20 using the method described in commonly-assigned U.S. patent application Ser. No. 403,095, filed July 29, 1982, now U.S. Pat. No. 4,626,067.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A method of forming a turn in a thin, relatively flat fiber optic cable assembly for laying under carpet and including:
    at least one resilient buffer tube;
    at least one optical conductor disposed inside said tube and having an outside diameter smaller than the inside diameter of said tube, said optical conductor being movable inside said tube;
    at least one strength member having limited elasticity;
    a plastic jacket extruded about said tube and said strength member so that said tube and said strength member are embedded therein, substantially the only air space inside said jacket being inside said tube, said jacket having a substantially flat top surface and a substantially flat bottom surface disposed substantially parallel to said top surface, said tube and said strength member being disposed in said jacket substantially midway between said surfaces, with said tube and strength member being spaced and with their respective axes positioned in a plane which is generally parallel to said surfaces, said method comprising the following steps:
    (1) forming spaced transverse cuts through said jacket without cutting said tube or said strength member;
    (2) forming longitudinal splits in said jacket intermediate said cuts at said tube and said strength member;
    (3) removing the jacket material between said cuts to expose said tube and said strength member;
    (4) positioning the cable portions between which the jacket has been removed to define the desired turn substantially in the plane of said bottom surface, the exposed strength member and the tube in said turn having substantially identical lengths and defining outside bends;
    (5) potting said cable portions and the exposed tube and exposed strength member in their positions defining said turn, substantially the only air space inside said potting being inside said tube and said potting having a height substantially identical to that of said jacket.

2. A thin, relatively flat fiber optic cable assembly for laying under carpet including a first relatively straight portion, a second relatively straight portion and a bend disposed between said portions, said cable assembly comprising:
    at least one resilient buffer tube extending substantially the length of said assembly;
    at least one optical conductor extending substantially the length of said assembly, disposed inside said tube and having an outside diameter smaller than the inside diameter of said tube, said optical conductor being movable inside said tube;
    at least one strength member having limited elasticity extending substantially the length of said assembly;
    a plastic jacket extruded about said tube and said strength member in said first and second straight portions so that said tube and said strength member are embedded therein, substantially the only air space inside said jacket being inside said tube, said jacket not being present in said bend, said jacket having a substantially flat bottom surface and said bend being formed substantially in the plane of said surface; and a potting compound holding said buffer tube and said strength member in said bend and the adjacent jacket in said first and second straight portions, substantially the only air space in the bend being inside said tube; said tube, said conductor and said strength member all forming an outside turn in said bend, and the lengths of said tube, said conductor and said strength member in said bend being substantially equal.

* * * * *

UNITED STATES PATENT AND TRADEMARK OFFICE
CERTIFICATE OF CORRECTION

PATENT NO. : 4,815,814
DATED : March 28, 1989
INVENTOR(S) : Thaddeus R. Ulijasz

It is certified that error appears in the above-identified patent and that said Letters Patent is hereby corrected as shown below:

Column 4, line 54, change "2" to --32--.

Column 5, line 59, change "patent application" to --Patent Application--.

Signed and Sealed this

Seventeenth Day of October, 1989

Attest:

DONALD J. QUIGG

Attesting Officer

Commissioner of Patents and Trademarks